(12) United States Patent
Hamada (10) Patent No.: US 10,136,042 B2
(45) Date of Patent: Nov. 20, 2018

(54) IMAGING DEVICE, FLASH CONTROL DEVICE, AND LIGHT EMISSION CONTROL METHOD

(71) Applicant: Olympus Corporation, Hachioji-shi, Tokyo (JP)

(72) Inventor: Takashi Hamada, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/588,861

(22) Filed: May 8, 2017

(65) Prior Publication Data

US 2017/0339328 A1 Nov. 23, 2017

(30) Foreign Application Priority Data

May 20, 2016 (JP) ................. 2016-101766

(51) Int. Cl.
*H04N 5/232* (2006.01)
*G03B 15/05* (2006.01)
*H04N 5/225* (2006.01)
*H04N 5/235* (2006.01)

(52) U.S. Cl.
CPC ......... *H04N 5/23203* (2013.01); *G03B 15/05* (2013.01); *H04N 5/2256* (2013.01); *H04N 5/2351* (2013.01); *H04N 5/2354* (2013.01)

(58) Field of Classification Search
None
See application file for complete search history.

(56) References Cited

U.S. PATENT DOCUMENTS

| | | | | |
|---|---|---|---|---|
| 5,384,611 A * | 1/1995 | Tsuji | ............. | G03B 7/16 396/180 |
| 6,029,013 A * | 2/2000 | Larkin | ............. | G03B 15/05 396/160 |
| 8,041,203 B2 * | 10/2011 | Kunishige | ............. | G03B 9/70 396/56 |
| 8,326,140 B2 * | 12/2012 | Clark | ............. | H04N 5/2256 396/182 |
| 8,559,804 B1 * | 10/2013 | Clark | ............. | G03B 17/00 348/211.2 |
| 8,600,224 B2 * | 12/2013 | Clark | ............. | G03B 15/05 396/56 |

(Continued)

FOREIGN PATENT DOCUMENTS

EP 2 632 147 8/2013

OTHER PUBLICATIONS

Extended Search Report to corresponding European Patent Application No. 17168726.2, dated Oct. 4, 2017 (7 pgs.).

*Primary Examiner* — Roberto Velez
*Assistant Examiner* — Cynthia Segura
(74) *Attorney, Agent, or Firm* — John C. Pokotylo; Pokotylo Patent Services (57) ABSTRACT

An imaging device connectable via a connector to a flash control device which is connectable via the connecting section and which has a memory storing information on whether or not to incorporate a flash function, the imaging device comprising: a controller which communicates with the flash control device connected to the connector, and controls the flash control device, wherein the controller communicates with the flash control device to determine the information, and switches control of the flash control device according to a determination result.

9 Claims, 5 Drawing Sheets

(56) References Cited

U.S. PATENT DOCUMENTS

| | | | |
|---|---|---|---|
| 8,614,766 B1* | 12/2013 | Clark | H04N 5/2256 |
| | | | 348/370 |
| 8,803,989 B2* | 8/2014 | Clark | H04N 5/2251 |
| | | | 348/211.99 |
| 2002/0064384 A1* | 5/2002 | Kawasaki | G03B 15/05 |
| | | | 396/157 |
| 2005/0168624 A1 | 8/2005 | Hasegawa | |
| 2008/0298793 A1 | 12/2008 | Clark | |
| 2012/0027395 A1* | 2/2012 | Clark | H04N 5/2256 |
| | | | 396/198 |
| 2012/0230663 A1* | 9/2012 | Ogasawara | G03B 7/16 |
| | | | 396/56 |
| 2013/0050510 A1* | 2/2013 | Fujihashi | G03B 15/05 |
| | | | 348/207.1 |
| 2013/0193853 A1* | 8/2013 | Gouji | H05B 37/02 |
| | | | 315/130 |
| 2015/0195445 A1* | 7/2015 | Watanabe | H04N 5/23209 |
| | | | 348/211.2 |
| 2017/0171447 A1* | 6/2017 | Yasuda | H04N 5/2256 |
| 2017/0343887 A1* | 11/2017 | Hoshino | G03B 15/05 |

* cited by examiner

IMAGING DEVICE, FLASH CONTROL DEVICE, AND LIGHT EMISSION CONTROL METHOD

CROSS-REFERENCE TO RELATED APPLICATIONS

Benefit is claimed, under 35 U.S.C. § 119, to the filing date of prior Japanese Patent Application No. 2016-101766 filed on May 20, 2016. This application is expressly incorporated herein by reference. The scope of the present invention is not limited to any requirements of the specific embodiments described in the application.

BACKGROUND OF THE INVENTION

1. Field of the Invention

The present invention relates to imaging devices, flash control devices, and light emission control methods capable of controlling light emission of an external flash device via a connecting section, such as a hot shoe.

2. Description of Related Art

Causing an external flash device to emit light in cooperation with an imaging device has been conventionally performed. An imaging device, such as a camera, acquires, from a flash device, information on a range of controllable amount of light emission in order to control an amount of light emission of the external flash device. In addition, the external flash device performs multi-light flash control to control not only one but also a plurality of flash devices via wireless connection.

In addition, in controlling an external flash device, there is proposed a flash control system in which a transmitter is wire-connected to the hot shoe of the camera, and the external flash device is wirelessly connected to the transmitter so as to control light emission (see Japanese Patent No. 5220104 (hereinafter, referred to as "Patent Literature 1")). Although a transmitter does not have a flash device mounted thereon and thus cannot emit light by itself, it is capable of causing an unspecified number of external flashes to emit light via wireless communication.

SUMMARY OF THE INVENTION

An imaging device according to a first aspect of the present invention is an imaging device connectable via a connector to a flash control device which is connectable via the connector and which has a memory storing information on whether or not to incorporate a flash function, the imaging device comprising: a controller which communicates with the flash control device connected to the connector, and controls the flash control device, wherein the controller communicates with the flash control device to determine the information, and switches control of the flash control device according to a determination result.

A flash control device according to a second aspect of the present invention is a flash control device connectable to an imaging device via a connector, comprising: a memory which stores information on whether or not to incorporate a flash; a first communication circuit for communicating with the imaging device; and a second communication circuit for communicating with an external flash device, wherein the flash control device transmits the information stored in the memory when communicating with the imaging device via the first communication circuit.

Alight emission control method according to a third aspect of the present invention is a light emission control method in an imaging device which is connectable via a connector to a flash control device having a memory storing information on whether or not to incorporate a flash, the light emission control method comprising: communicating with the flash control device connected to the connector to acquire the information; and switching control of the flash control device, on the basis of the acquired information.

DETAILED DESCRIPTION OF THE PREFERRED EMBODIMENTS

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Hereinafter, there will be described an example as an embodiment of the present invention in which a transmitter is connected to a digital camera (hereinafter, referred to as "camera") to control light emission of an external flash device. The camera, which has an imaging section, converts a subject image into image data by the imaging section and performs live-view display of the subject image on a display section provided on the back side of the main body, on the basis of the converted image data. The photographer determines the composition or shutter timing by observing the live-view display. At the time of release operation, the image data is recorded in a recording medium. The image data recorded in the recording medium can be reproduced and displayed on the display section when a reproduction mode is selected.

In addition, the camera can mount, on the hot shoe, a transmitter having a memory which stores information on whether or not to incorporate a flash. The camera can acquire the information from the transmitter via the hot shoe, and can output to the transmitter signals, such as a light emission start signal or a light emission amount signal. The transmitter, which is connectable to a plurality of external flashes (also referred to as "remote flash") via wireless communication, outputs the light emission start signal or the like from the camera to the external flashes via wireless communication.

In addition, the camera receives, from the transmitter, information on whether or not the flash is incorporated. Additionally, the camera, when having determined that the device (transmitter) mounted on the camera does not incorporate a flash on the basis of the received information, communicates with the transmitter in a manner excluding the information on the control range of amount of flash light emission. Furthermore, the camera, when a flash device is not incorporated, performs pre-emission only once. Alternatively, the camera performs pre-emission twice or more and performs communication to specify a relative value of the amount of light emission at the time of main emission.

Figure 1:
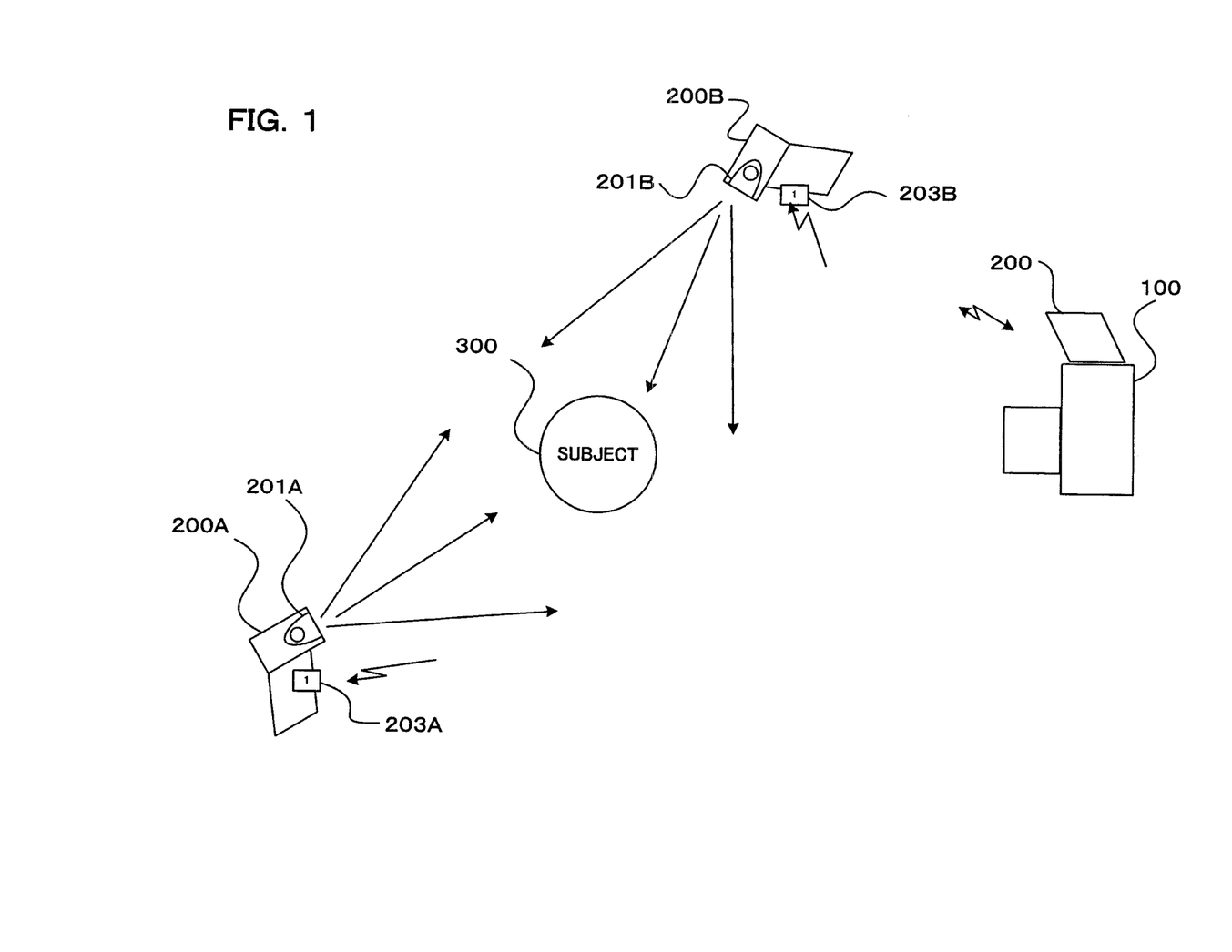
FIG. 1 illustrates a flash system having a camera, a transmitter, and an external flash device according to an embodiment of the present invention.

FIG. 1 illustrates an arrangement of a camera 100, a transmitter 200, and slave flashes 200A and 200B according to an embodiment of the present invention. Note that, although there are provided two slave flashes in FIG. 1, this is not limiting and there may be, for example, one, three, or more slave flashes.

The camera 100 can mount the transmitter 200 via the hot shoe, and the transmitter 200 is wire-connected to the camera 100 as will be described below. The slave flashes 200A and 200B are arranged around a subject 300. The slave flashes 200A and 200B have flashes 201A and 201B, and wireless communication sections 203A and 203B, respectively.

Having received a pre-emission signal and an main emission signal from the camera 100, the transmitter 200 instructs the slave flashes 200A and 200B to perform pre-emission and main emission via wireless communication. As thus described, the camera 100 according to the present embodiment is capable of causing the slave flashes 200A and 200B located outside to emit light. In other words, the flash control device (here, the transmitter 200) is capable of performing wireless communication with the flash device (here, slave flashes 200A and 200B) to control the flash device.

Figure 2A:
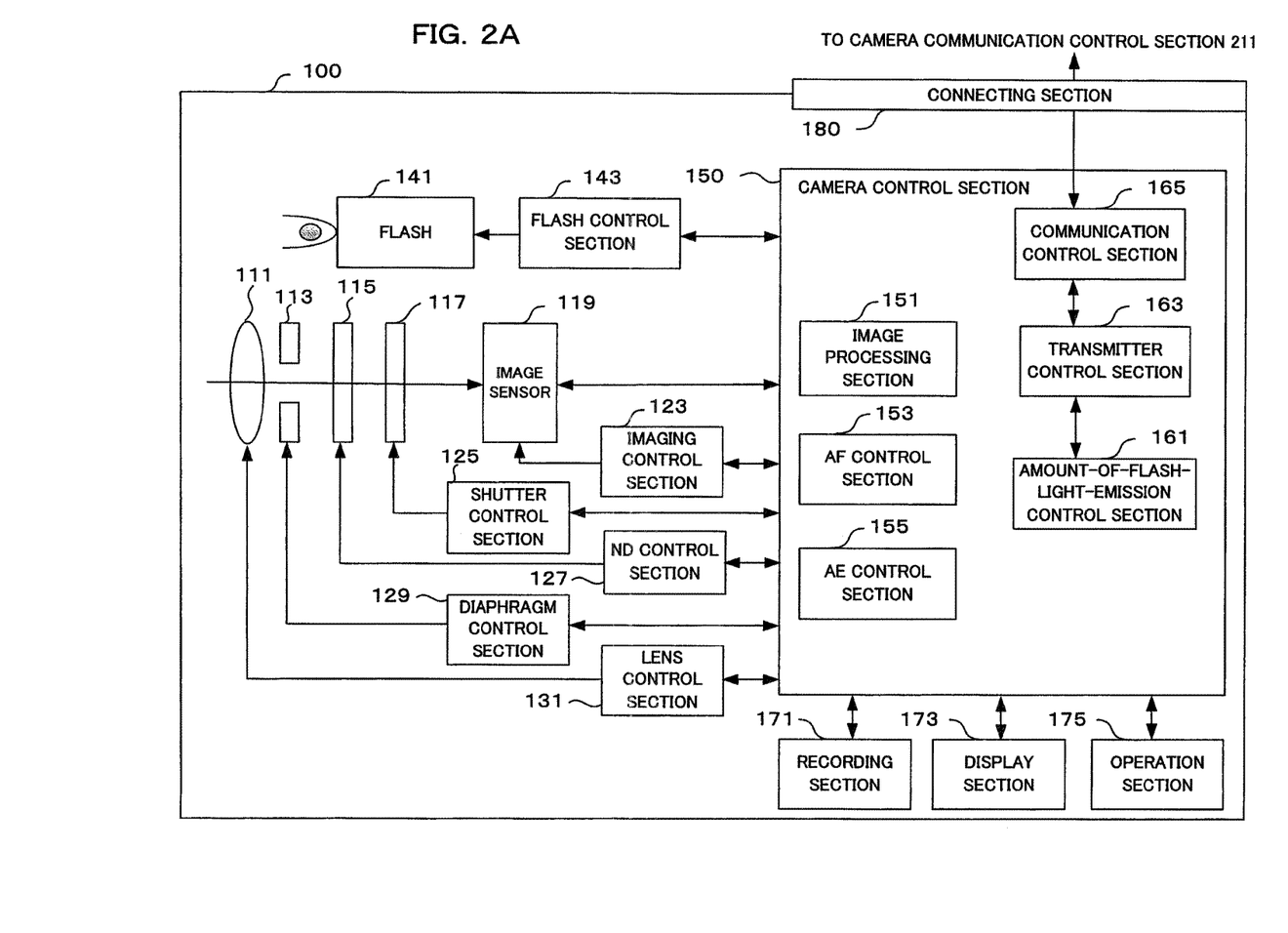
FIGS. 2A and 2B are block diagrams illustrating mainly electrical configurations of the camera and the transmitter according to an embodiment of the present invention.
Figure 2B:
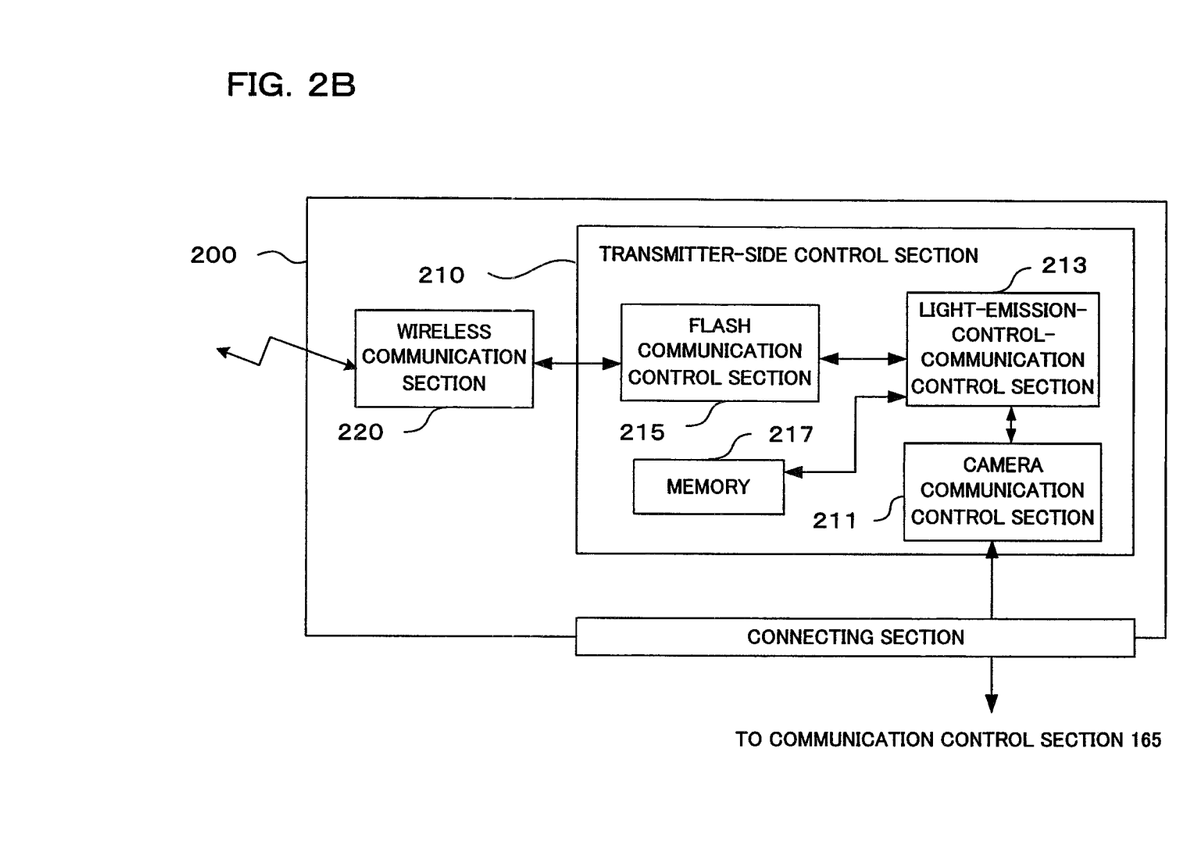

Next, mainly electrical configurations of the camera 100 and the transmitter 200 will be described, referring to FIGS. 2A and 2B. FIG. 2A illustrates a configuration of the camera 100 and FIG. 2B illustrates a configuration of the transmitter 200.

A photographic lens 111 is an optical lens for forming a subject image of a subject, and a lens control section 131 causes a focus lens and a zoom lens to move in the optical axis direction. A diaphragm 113, an ND filter 115, and a shutter 117 are provided on the optical axis of the photographic lens 111, with an image sensor 119 being provided at a position on the optical axis of the photographic lens 111 in the proximity of the image forming position of the optical image.

The diaphragm 113, having a variable diaphragm diameter, controls the light flux (amount of light) of the photographic optical system. A diaphragm control section 129 controls the diaphragm value corresponding to the diaphragm aperture. The diaphragm 113 adjusts the amount of light of the subject light flux that has passed the photographic lens 111, on the basis of control signals from the diaphragm control section 129. The ND filter 115 is an optical filter which reduces the amount of transmission of the subject light flux, and is driven to be movable forward or backward in a direction perpendicular to the optical axis of the photographic lens 111, on the basis of control signals from an ND control section 127.

At the time of shooting, the shutter 117 allows the subject light flux to pass through for a time period determined by the shutter second time, on the basis of control signals from a shutter control section 125. In addition, the shutter is in an open state at the time of live-view display. At the time of actual shooting, the shutter 117 controls the exposure time and an electronic shutter described below performs exposure control during live-view display.

The image sensor 119 performs photoelectric conversion of the subject image formed by the photographic lens 111, and outputs an image signal to a camera control section 150. An imaging control section 123 has an imaging control circuit and controls electric charge accumulation, reading, and the like of the image sensor 119, on the basis of control signals from the camera control section 150. Note that the image sensor 119 and the imaging control section 123 can realize the function of a so-called electronic shutter, and control exposure by the electronic shutter during live-view display. In addition, exposure control can be performed by the diaphragm 113, the ND filter 115, the shutter 117, or the like, and part of which may be omitted as appropriate.

In addition, the camera 100 has provided therein a built-in flash having a flash 141 and a flash control section 143. The flash 141 has a light emission section such as a xenon tube, and the flash control section 143, which has a flash control circuit, controls the light emission timing and the amount of light emission in each of pre-emission and main emission in accordance with control signals from the camera control section 150.

The camera control section 150 has a CPU (Central Processing Unit), a peripheral circuit thereof, a memory, and the like. The CPU controls the camera as a whole by controlling respective sections in the camera 100 in accordance with programs stored in the memory. The camera control section 150 has an image processing section 151, an AF control section 153, an AE control section 155, an amount-of-flash-light-emission control section 161, a transmitter control section 163, and a communication control section 165. Each of the sections is realized by performing software-based control of functions of the peripheral circuit by the CPU.

The image processing section 151, having an image processing circuit, receives input of image signals from the image sensor 119, performs various types of image processing such as amplification processing, AD conversion processing, OB processing, or gamma processing, and outputs image data. The AF control section 153, having a focus detection circuit, extracts a contrast signal using the image data based on output of the image sensor 119, and controls the position of a focus lens in the photographic lens 111 via the lens control section 131 so that the contrast signal reaches its peak.

The AE control section 155, having an exposure control circuit, calculates a subject brightness value using the image data based on output of the image sensor 119, and calculates, on the basis of the subject brightness value, a diaphragm value providing an appropriate exposure, presence or absence of ND filter, shutter speed, ISO sensitivity, or the like. The AE control section 155 controls, on the basis of the calculation result, the amount of exposure via the imaging control section 123, the shutter control section 125, the ND control section 127, the diaphragm control section 129, or the like.

The amount-of-flash-light-emission control section 161 calculates the amount of light emission of an internal flash and an external flash, on the basis of subject brightness information from the AE control section 155, focus lens position information of the photographic lens 111, or the like. In addition, the amount-of-flash-light-emission control section 161 controls the amount of light emission in external flash devices 200A and 200B via the communication control section 165, the transmitter 200, or the like. Furthermore, in a case where other light emission modes such as a slave flash mode has been set, the amount-of-flash-light-emission control section 161 performs a light emission control in accordance with the mode.

Figure 3:
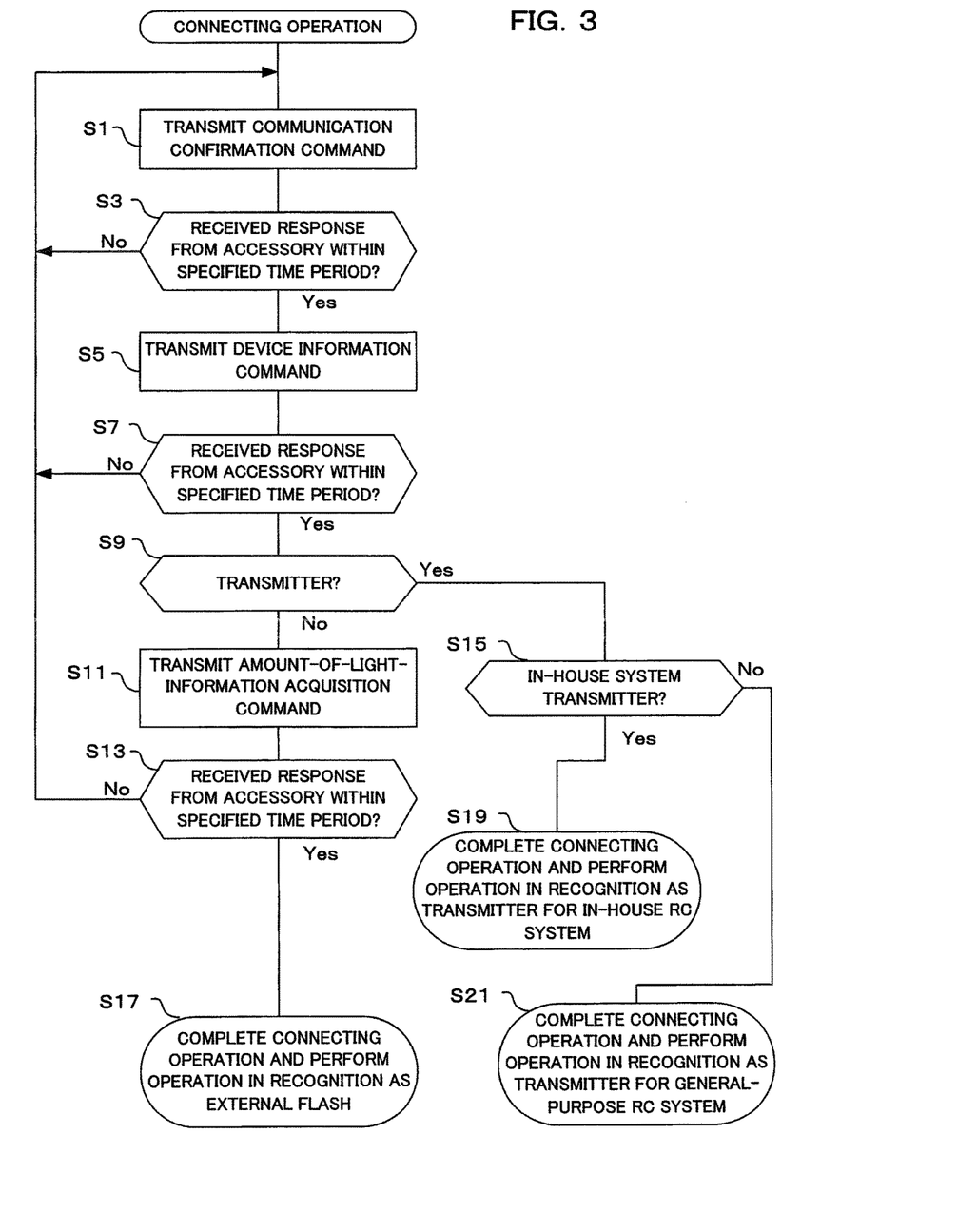
FIG. 3 is a flowchart illustrating an operation of connecting the camera and the transmitter according to an embodiment of the present invention.
Figure 4:
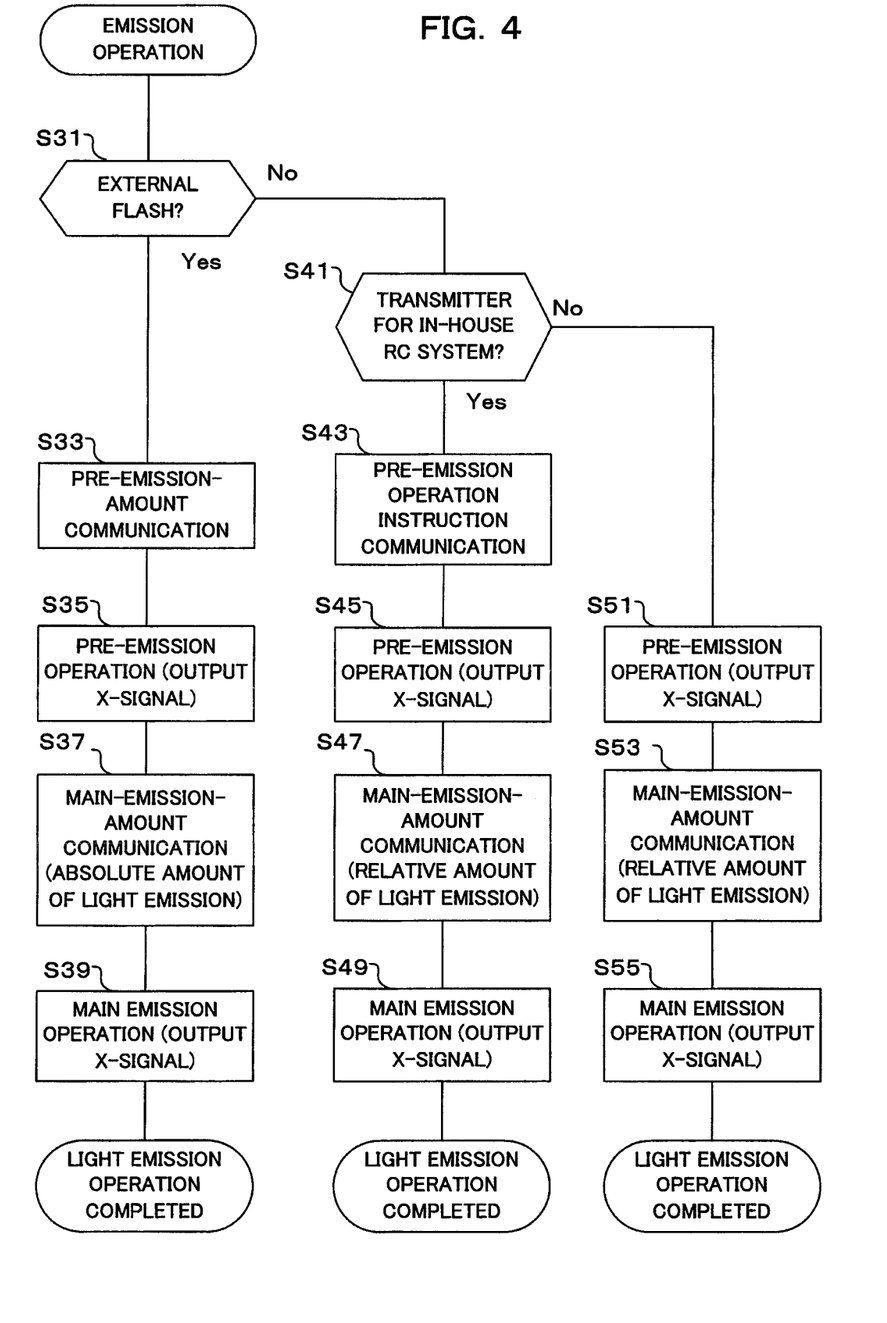
FIG. 4 is a flowchart illustrating an operation of light emission in the camera according to an embodiment of the present invention.

The transmitter control section 163 generates signals indicating the amount of flash light emission, pre-emission timing, main emission timing, and the like, calculated by the amount-of-flash-light-emission control section 161, and controls transmission to the transmitter 200 via the communication control section 165 (see, for example, FIG. 4). In addition, the transmitter control section 163 determines the types of the external flash devices 200A and 200B, and the transmitter 200 on the basis of signals from the transmitter 200 (see, for example, S9 and S15 of FIG. 3), and performs a control in accordance with the determination result (see, for example, S17, S19 and S21 of FIG. 3).

The transmitter control section 163, which communicates with the flash control device connected to the hot shoe, functions as a controller which controls the flash control device. The controller communicates with the flash control device to determine information, and switches control of the flash control device in accordance with the determination result (see, for example, S17, S19 and S21 of FIG. 3).

Additionally, the controller, in a case of having determined that the flash device is not incorporated on the basis of the information, when communicating with the flash control device connected to the hot shoe to control the flash control device, performs communication in a manner excluding second information on a control range of an amount of flash light emission (see, for example, S11 of FIG. 3). The controller, in a case of having determined that the flash device is not incorporated on the basis of the information, when performing dimming control by pre-emission of the flash, performs the control by communicating with the flash control device to limit the number of times of pre-emission to one (see, for example, S51 of FIG. 4).

In addition, the controller, in a case of having determined that the flash device is not incorporated on the basis of the information, when performing dimming control by pre-emission of the flash, performs the control by communicating with the flash control device to set the amount of light emitted in the pre-emission to a predetermined amount of light emission (see, for example, S43 of FIG. 4). The controller, in a case of having determined that the flash device is not incorporated on the basis of the information, when performing dimming control by pre-emission of the flash, performs communication to specify an amount of light to be emitted in the main emission by a relative value of the amount of light emitted in the pre-emission in accordance with the detection result of pre-emission by the flash device with instruction of a pre-emission (see, for example, S47 and S53 of FIG. 4).

The communication control section 165, having a communication circuit, transmits signals to the transmitter 200 and receives signals from the transmitter 200, in accordance with control signals from the transmitter control section 163.

A recording section 171, including a detachable recording medium in the camera 100, records image data in the recording medium. In addition, the recording section 171 reads the recorded image data and outputs the image data to the image processing section 151 of the camera control section 150. The image processing section 151 converts the read-out image data into image data for reproduction, and displays the reproduction image on the display section 173.

The display section 173 has a display panel provided on the back side, or the like, of the camera main body, and/or an electronic finder, or the like. The display section 173 performs a variety of presentation such as a menu screen for camera operation, other than the aforementioned reproduction image or live-view display. The photographer can set a mode or the like for flash photography on the menu screen.

An operation section 175, having various types of operation members, such as a power switch, a release button, a cross button, and an OK button, detects the operation state of such operation members and outputs the operation state to the camera control section 150. In addition, the operation section 175, having a touch panel for detecting touch operations and the like on the display section 173, outputs the detection result to the camera control section 150.

A connecting section 180, which is a so-called hot shoe in the present embodiment, can mount the transmitter 200. When the transmitter 200 is mounted, a plurality of contact points is connected between the communication control section 165 in the camera 100 and a camera communication control section 211 in the transmitter 200, thereby allowing wired communication.

A transmitter-side control section 210 and a wireless communication section 220 are provided in the transmitter 200 illustrated in FIG. 2B. The transmitter-side control section 210 includes the camera communication control section 211, a light-emission-control-communication control section 213, a flash communication control section 215, and a memory 217. The transmitter side control section 210, having a CPU and a peripheral circuit thereof, performs control in the transmitter 200 in accordance with a program stored in the memory 217. The camera communication control section 211, the light-emission-control-communication control section 213, and the flash communication control section 215 are realized by performing software-based control of functions of the peripheral circuit by the CPU.

The camera communication control section 211, having a communication circuit, controls transmission and reception to and from the communication control section 165 in the camera 100 via the connecting section 180, as described above. The camera communication control section 211 functions as a first communication circuit for communicating with the imaging device. Information stored in the memory is transmitted when communication is performed with the imaging device via the first communication circuit (see S5 and S7 of FIG. 3).

The light-emission-control-communication control section 213 causes the slave flashes 200A and 200B to start light emission on the basis of the light emission start signal from the camera 100 received by the camera communication control section 211, and controls the amount of light emission. In addition, the light-emission-control-communication control section 213 transmits a response signal to a command signal of inquiry from the camera 100.

The flash communication control section 215 controls the wireless communication section 220 in accordance with the control signal from the light-emission-control-communication control section 213, to control the communication with the slave flashes 200A and 200B. The memory 217 storing the aforementioned programs also has stored therein a variety of information such as information indicating that the transmitter 200 does not incorporate a flash. The memory 217 functions as a memory storing information on whether or not to incorporate a flash.

The wireless communication section 220, having a wireless communication circuit, performs wireless communication with the wireless communication sections 203A and 203B of the slave flashes 200A and 200B. In other words, the wireless communication section 220 wirelessly transmits signals such as pre-emission start signals, main emission start signals, pre-emission-amount signals, and main-emission-amount signals from the camera 100. The wireless communication section 220 functions as a second communication circuit for communicating with an external flash device.

Next, there will be described an operation when the camera 100 is connected to the transmitter 200, referring to the flowchart illustrated in FIG. 3. The flowchart is executed by the CPU in the camera control section 150, in accordance with the program stored in the memory. Note that the same goes also for the flowchart illustrated in FIG. 4 described below.

When the camera 100 is powered on, or when an accessory, such as the transmitter 200 or the external flash devices 200A and 200B, is connected to the connecting section (hot shoe) 180 with the camera 100 being powered on, the flow of the connecting operation illustrated in FIG. 3 starts. First, a communication confirmation command is transmitted (S1). Here, the transmitter control section 163 transmits the communication confirmation command to the transmitter-side control section 210 via the communication control section 165 and the connecting section 180.

Having transmitted the communication confirmation command, the transmitter control section 163 next determines whether or not there is a response from the accessory within a specified time period (S3). Having received the communication confirmation command, the camera communication control section 211 in the transmitter-side control section 210 transmits a response signal to the camera 100. Accordingly, at step S3, the determination is made based on whether or not a response signal has been sent back from the transmitter 200. When there is no response as the result of determination at step S3, the camera 100 returns to step S1 to perform the aforementioned operation.

When, on the other hand, there is a response as the result of determination at step S3, the camera 100 next transmits a device information command (S5). The connecting section 180 of the camera 100 can mount accessories such as the external flash devices 200A and 200B besides the transmitter 200. Therefore, the camera 100 transmits the device information command to send back the type of the accessory mounted on the connecting section 180.

Having transmitted the device information command, the camera 100 next determines whether or not there is a response from the accessory within a specified time period (S7). Having received the device information command, the mounted accessory sends back information indicating the type of the mounted accessory to the camera 100. In a case where the mounted accessory is the transmitter 200, information indicating a transmitter is stored in the memory 217 as the device information, and the transmitter 200 transmits the information to the camera 100. In addition, the information indicating the transmitter includes information indicating whether or not the transmitter is a transmitter for in-house remote control (RC) system. At step S7, the camera 100 determines based on whether or not the information has been sent back within a specified time period. When there is no response as the result of determination, the camera 100 returns to step S1 to perform the aforementioned operation.

When, on the other hand, there is a response as the result of determination at step S7, the camera 100 next determines whether or not the device information indicates the transmitter (S9). Here, the camera 100 determines whether or not the device information sent back from the accessory indicates the transmitter.

When the information does not indicate the transmitter as the result of determination at step S9, the camera 100 transmits an amount-of-light-information acquisition command (S11). Since the transmitter is not mounted, the accessory mounted on the camera 100 turns out to be an external flash device. In order to control the external flash device, the amount-of-light-information acquisition command is transmitted to the camera 100 so as to transmit amount-of-light information on a range of controllable amount of light emission of the external flash device.

Having transmitted the amount-of-light-information acquisition command, the camera 100 determines whether or not there is a response from the accessory within a specified time period (S13). Since the amount-of-light information is supposed to be transmitted in a case where the accessory connected to the connecting section 180 is an external flash device, the camera 100 waits for a specified time period. When there is no response within a specified time period as the result of determination, the camera 100 returns to step S1 to perform the aforementioned operation.

When, on the other hand, having acquired the amount-of-light information as the result of determination at step S13, the camera 100 completes the connecting operation, recognizes the accessory as an external flash, and performs an operation (S17). In this case, the camera 100 recognizes the accessory as an external flash, and performs a light emission operation (see S33 to S39 of FIG. 4).

Returning to step S9, when the accessory is a transmitter as the result of determination at step S9, the camera 100 next determines whether or not the transmitter is a transmitter for in-house system (S15). There may be a transmitter which is operable in conjunction with the camera 100 (in-house system), and a transmitter which is not operable in conjunction with the camera 100 (general-purpose system). Here, the camera 100 determines whether or not the transmitter is a transmitter for in-house system, on the basis of the device information sent back from the accessory.

When the transmitter is a transmitter for in-house system as the result of determination at step S15, the camera 100 completes the connecting operation, recognizes the accessory as a transmitter for in-house remote control (RC) system, and performs an operation (S19). In this case, the camera 100 recognizes the accessory as a transmitter for in-house RC system, and performs a light emission operation (see S43 to S49 of FIG. 4).

When the transmitter is not a transmitter for in-house system as the result of determination at step S15, the camera 100 completes the connecting operation, recognizes the transmitter as a transmitter for a general-purpose remote control (RC) system, and performs an operation (S21). In this case, the camera 100 recognizes the transmitter as a transmitter for a general-purpose RC system, and performs a light emission operation (see S51 to S55 of FIG. 4).

Next, the light emission operation will be described, referring to the flowchart illustrated in FIG. 4. The light emission operation is performed when the release button is fully pressed down to perform actual shooting with the camera 100 being set to the shooting mode to perform shooting using the flash.

When the flow proceeds to the light emission operation illustrated in FIG. 4, the camera 100 first determines whether or not the connected accessory is an external flash device (S31). Here, the camera 100 determines whether or not the accessory is an external flash device on the basis of the device information received from the accessory at step S7.

When the mounted accessory is an external flash device as the result of determination at step S31, the camera 100 performs pre-emission-amount communication (S33). Pre-emission refers to causing the flash device to emit light with a predetermined amount of light emission before the main emission. Measuring the light reflected from the subject 300 at the time of pre-emission allows calculation of an amount of light emission providing an appropriate amount of exposure at the time of main emission. At this step, the amount of light emission is transmitted to the external flash device when pre-emission is performed by the amount-of-flash-light-emission control section 161, the transmitter control section 163, and the communication control section 165.

Having performed the pre-emission-amount communication, the camera 100 next performs a pre-emission operation (S35). Here, the transmitter control section 163 and the communication control section 165 transmit an instruction to perform pre-emission (X-signal) to the external flash device. When the built-in flash 141 or a plurality of external flash devices is used, the plurality of flashes is synchronized to simultaneously perform pre-emission.

Having performed the pre-emission operation, the camera 100 next performs main-emission-amount communication (S37). The amount-of-flash-light-emission control section 161 acquires the amount of reflected light from the subject 300 on the basis of the image data generated when the image sensor 119 received the light at the time of pre-emission, and calculates the amount of main emission providing an appropriate exposure at the time of main emission. The amount of main emission is calculated in terms of the absolute amount of light emission. The camera 100 transmits the amount of main emission to the external flash device, on the basis of the calculation result of the amount of main emission.

Having transmitted the amount of main emission, the camera 100 next performs a main emission operation (S39). Here, an instruction to perform main emission (X-signal) is transmitted to the external flash device. When the built-in flash 141 or a plurality of external flash devices is used, the flashes are synchronized to simultaneously perform main emission. In addition, the light emission at this time causes light emission with the amount specified at step S37. Having performed the main emission operation, the camera 100 completes the light emission operation.

Returning to step S31, when the accessory is not an external flash device as the result of determination at this step, the camera 100 determines whether or not the transmitter is a transmitter for in-house remote control (RC) system (S41). Here, similarly to step S15, the camera 100 determines whether or not the transmitter is a transmitter for in-house RC system, on the basis of the device information received from the accessory at step S7.

When the transmitter is a transmitter for in-house RC system as the result of determination at step S41, the camera 100 performs communication to instruct execution of the pre-emission operation (S43). Since it is possible to control the slave flash 200A or the like at the time of pre-emission in a case where the transmitter is a transmitter for in-house RC system, there is provided an operation instruction notifying that the next light emission operation is a pre-emission operation, or an instruction specifying the number of pre-emission operations and the amount of light emission. Since the transmitter is a transmitter for in-house RC system, information, such as a range of controllable amount of light emission of a remote flash, can be preliminarily recognized, whereby it is possible to determine an optimal amount of light emission or number of times of light emission within the range. At this step, therefore, the camera 100 instructs the number of pre-emission operations and the amount of light emission.

Having instructed execution of a pre-emission operation, the camera 100 next performs the pre-emission operation (S45). Here, the transmitter control section 163 and the communication control section 165 transmit an instruction to perform pre-emission (X-signal) to the transmitter 100. In response to the pre-emission instruction, the slave flash 200A and the like perform pre-emission in a synchronized manner. When the built-in flash 141 is also supposed to be used, it also performs pre-emission in a synchronized manner.

Having performed the pre-emission operation, the camera 100 next performs main-emission-amount communication (S47). The amount-of-flash-light-emission control section 161 acquires the amount of reflected light from the subject 300 on the basis of the image data generated when the image sensor 119 received the light at the time of pre-emission, and calculates the amount of main emission providing an appropriate exposure at the time of main emission. However, it is impossible to instruct the slave flash 200A, or the like, of an appropriate exposure amount at the time of main emission in terms of the absolute amount of light emission, based on the amount of pre-emission by the slave flash 200A or the like. This is because when, for example, controlling a plurality of the slave flashes 200A or 200B, it is impossible to instruct the absolute amount of light emission individually because the degree of contribution of individual flashes is unknown. Therefore, the amount-of-flash-light-emission control section 161 calculates an amount of difference required to provide an appropriate exposure amount from the exposure amount measured at the time of pre-emission, and calculates, from the amount of difference, a relative amount of light emission against the pre-emission providing the appropriate exposure amount. In other words, it calculates an amount indicating the amount of light, in terms of EVs, to be increased or decreased from the amount of light emission at the time of pre-emission. On the basis of the calculation result of the amount of main emission, the amount of main emission expressed by the relative value is transmitted to the external flash device.

Having performed the main-emission-amount communication, the camera 100 next performs the main emission operation (S49). Here, an instruction to perform main emission (X-signal) is transmitted to the transmitter 200. In response to the main emission instruction, the slave flash 200A and the like perform main emission in a synchronized manner. When the built-in flash 141 is also used, it is also caused to perform main emission in a synchronized manner. The main emission at this time causes light emission with the amount of main emission specified in terms of the relative amount of light emission transmitted at step S47. Having performed the main emission operation, the camera 100 completes the light emission operation.

Returning to step S41, when the transmitter is not a transmitter for in-house RC system as the result of determination, it turns out to be a transmitter for a general-purpose RC system. In this case, the camera 100 performs a pre-emission operation (S51). Since it is a general-purpose RC system, it is difficult to control a slave flash by the transmitter 200. Therefore, only a pre-emission operation (X-signal) indicating the timing of pre-emission is instructed from the camera 100.

Having performed the pre-emission operation, the camera 100 next performs main-emission-amount communication (S53). Also in a general-purpose RC system, the camera 100 can acquire the subject brightness on the basis of the amount of reflected light from the subject 300, to calculate a relative amount of light emission providing an appropriate exposure. At step S53, the relative amount of light emission is transmitted to the transmitter 200.

Having performed the main-emission-amount communication, the camera 100 next performs the main emission operation (S55). Here, an instruction to perform main emission (X-signal) is transmitted to the transmitter 200. In response to the main emission instruction, the slave flash 200A and the like perform main emission in a synchronized manner. When the built-in flash 141 is also supposed to be used, it also performs main emission in a synchronized manner. The main emission at this time causes light emission with the amount of main emission specified in terms of the relative amount of light emission transmitted at step S53. Having performed the main emission operation, the camera 100 completes the light emission operation.

Note that, in the flowchart illustrated in FIG. 4, the process for pre-emission with an external flash being mounted (S33, S35) and the process for pre-emission with a transmitter for in-house RC system being mounted (S43, S45) are described for a case where pre-emission is performed once. However, the number of times of pre-emission is not limited to one and may be two or more. In the case of a transmitter for a general-purpose RC system, it is assumed that the pre-emission operation is performed only once (S51).

As has been described above, an embodiment of the present invention is configured to communicate with a flash control device (e.g., the transmitter 200) connected to the connecting section 180 (e.g., hot shoe) (S1), acquire information on whether or not to incorporate a flash (S5), and switch control of the flash control device, on the basis of the acquired information (S9). In an embodiment, a flash is not incorporated in a case where the device connected to the connecting section 180 is the transmitter 200, whereas a flash is incorporated in a case where the external flash devices 200A and 200B are connected. Accordingly, an error state never occurs even when it is impossible to acquire information of an external flash device, such as a range of controllable amount of light, from a flash control device connected to an imaging device via a connecting section. In other words, although it is impossible to acquire information, such as a range of controllable amount of light, in a case of a flash control device not incorporating a flash, it is possible to prevent an error state from occurring by acquiring the information and switching control of the flash control device.

In addition, in an embodiment of the present invention, the flash control device (e.g., the transmitter 200) has a storage section (e.g., memory 217) storing information on whether or not to incorporate a flash. The flash control device is connectable to an imaging device (e.g., the camera 100) via a connecting section (hot shoe). The imaging device has a control section (e.g., the transmitter control section 163 of FIG. 2) which communicates with the flash control device connected to the hot shoe (S1 of FIG. 3) to control the flash control device, and the control section communicates with the flash control device to determine the aforementioned information and switches control of the flash control device in accordance with the determination result (see, for example, S9 of FIG. 3 and S31 of FIG. 4). Accordingly, it is possible to switch control of the flash control device on the basis of the information, and prevent an error state from occurring.

In addition, in an embodiment of the present invention, when it is determined that the external flash device does not incorporate a flash device on the basis of the information, communication is performed in a manner excluding second information on a range of amount of flash light (for example, amount-of-light information is acquired when a flash device is incorporated (S11 of FIG. 3), whereas communication for acquiring the amount-of-light information is not performed when a flash device is not incorporated). When the second information on a range of amount of flash light is requested in a case where a flash device is not incorporated, as with the transmitter 200, the external flash device cannot send back the second information, and therefore the camera 100 falls into an error state, making it impossible to cause the slave flash connected to the transmitter 200 via wireless communication to emit light. In view of this, in the present embodiment, an error state is not caused because communication is performed in a manner excluding the second information.

In addition, an embodiment of the present invention is configured to perform dimming control by communicating with the flash control device to limit the number of times of pre-emission to one when performing dimming control using pre-emission of the flash in a case where it is determined on the basis of the information that the external flash device does not have a built-in flash device (see, for example, S51 of FIG. 4). Since details of the remote flash being controlled by the transmitter is unknown in a case of a transmitter for a general-purpose RC system (for example, the range of controllable amount of light is unknown), it is impossible to acquire sufficient information even when pre-emission is performed for a plurality of times. Therefore, the number of times of pre-emission is limited to one so as to prevent waste of light emission.

In addition, in an embodiment of the present invention, the camera, in a case of having determined that the external flash device does not incorporate a flash device on the basis of the information, when performing dimming control by pre-emission of the flash, performs the control by communicating with the flash control device to set the amount of light to be emitted in the pre-emission to a predetermined amount of light emission (see, for example, S43 of FIG. 4). The amount of light to be emitted in the pre-emission is varied each time such as by gradually increasing the amount of light. The amount of light to be emitted in the pre-emission can be preliminarily determined in an in-house RC system, and setting the amount of light emission in accordance therewith allows the amount of light emission to be calculated more accurately.

In addition, in an embodiment of the present invention, the camera, in a case of having determined that the external flash device does not incorporate a flash device on the basis of the information, when performing dimming control by pre-emission of the flash, performs communication to specify an amount of light to be emitted in the main emission in terms of a relative value of the amount of light emitted in the pre-emission in accordance with the detection result of pre-emission by the flash device with an instruction of pre-emission (see, for example, S47 and S53 of FIG. 4). Although the amount of main emission cannot be specified in terms of an absolute value based on the detection result of pre-emission, it is possible to calculate an amount of main emission to be increased or decreased relative to the pre-emission in order to provide an appropriate exposure amount. Specifying the relative amount of light emission makes it possible to acquire an almost appropriate exposure.

Additionally, in an embodiment of the present invention, a flash control device (e.g., the transmitter 100) is provided with a storage section (memory 217 of FIG. 2) storing information on whether or not to incorporate a flash and, when communication is performed with the imaging device (e.g., the camera 100), transmits the information on whether or not to incorporate a flash stored in the storage section. In other words, the imaging device 100 can recognize whether or not the flash control device mounted on the connecting section incorporates a flash. Accordingly, it is possible to prevent an error state from occurring because it is impossible to acquire information on a control range of amount of light emission of the flash device.

Note that, in an embodiment of the present invention, the transmitter 200 communicates with the slave flashes 200A and 200B via wireless communication. The wireless communication, which is not limited to so-called radio-frequency bands, may use any band that allows short range communication such as, for example, infrared communication bands.

In addition, in an embodiment of the present invention, although the imaging control section 123, the shutter control section 125, the ND control section 127, the diaphragm control section 129, the lens control section 131, and the camera control section 150 are provided as separate components, it goes without saying that all or a part of the components may be implemented by software which is executed by a CPU in the control section 150. In addition, it goes without saying that all or a part of components such as the imaging control section 123 or shutter control section 125 may be realized by a circuit implemented by program codes such as DSP (Digital Signal Processor), may be a hardware arrangement such as a gate circuit generated on the basis of a programming language written in Verilog, or may be implemented by a hardware circuit.

Additionally, in an embodiment of the present invention, the image processing section 151, the AF control section 153, the AE control section 155, the amount-of-flash-light-emission control section 161, and the transmitter control section 163 in the camera control section 150, and the camera communication control section 211, the light-emission-control-communication control section 213, and the flash communication control section 215 in the transmitter-side control section 210 are realized by the CPU and peripheral circuits thereof using software. However, it goes without saying that this is not limiting and the aforementioned components may be implemented by a hardware circuit. Furthermore, the aforementioned components may be configured by a hardware component such as a gate circuit generated on the basis of a programming language written in Verilog, or may employ a hardware component using software such as a DSP (Digital Signal Processor). It goes without saying that the aforementioned configurations may be combined as appropriate.

In addition, although a digital camera is used as the photographic device described in the present embodiment, the camera may be a digital single-lens reflex camera, mirrorless camera, or a compact digital camera, or may be a motion picture camera such as a video camera or a movie camera, or further may be a camera built in a cell-phone, a smart phone, a personal digital assistant, a personal computer (PC), a tablet type computer, a gaming device, or the like. The present invention may be applied to any device provided that a flash control device such as a transmitter is mountable thereon.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device connectable via a connector to a flash control device which is connectable via the connector and which has a memory, the imaging device comprising:
  a controller which communicates with the flash control device connected to the connector, and controls the flash control device, wherein
  the memory of the flash control device stores information on whether or not the flash control device incorporates a flash, and
  the controller (1) communicates with the flash control device to receive the information on whether or not the flash control device incorporates a flash, (2) determines whether or not the flash control device incorporates a flash using the received information, and (3) switches control of the flash control device in accordance with its determination of whether or not the flash control device incorporates a flash.

2. The imaging device according to claim 1, wherein the controller, in a case of having determined that the flash control device incorporates a flash, communicates second information on a control range of an amount of flash light emission to the flash control device, and otherwise, in a case of having determined that the flash control device does not incorporate a flash, excludes the second information on a control range of an amount of flash light emission from communications with the flash control device.

3. The imaging device according to claim 2, wherein the controller, in a case of having determined that the flash control device does not incorporate a flash, performs pre-emission dimming control by communicating with the flash control device to limit a number of times of pre-emission to one.

4. The imaging device according to claim 3, wherein the controller, in a case of having determined that the flash control device does not incorporate a flash, when performing dimming control by pre-emission of a flash, performs communication to specify an amount of light emitted in main emission by a relative value of the amount of light emitted in pre-emission in accordance with a detection result of the pre-emission by the flash device with instruction to perform the pre-emission.

5. The imaging device according to claim 2, wherein the controller, in a case of having determined that the flash control device does not incorporate a flash, when performing dimming control by pre-emission of a flash, performs the control by communicating with the flash control device to set an amount of light emitted in the pre-emission to a predetermined amount of light emission.

6. The imaging device according to claim 5, wherein the controller, in a case of having determined that the flash control device does not incorporate a flash, when performing dimming control by pre-emission of a flash, performs communication to specify an amount of light emitted in main emission by a relative value of the amount of light emitted in pre-emission in accordance with a detection result of the pre-emission by the flash device with instruction to perform the pre-emission.

7. The imaging device according to claim 1, wherein the flash control device performs wireless communication with a flash device to control the flash device.

8. A flash control device connectable to an imaging device via a connector, comprising:
   a memory which stores information on whether or not the flash control device incorporates a flash;
   a first communication circuit for communicating with the imaging device; and
   a second communication circuit for communicating with an external flash device, wherein
   the flash control device transmits the information on whether or not the flash control device incorporates a flash stored in the memory, when communicating with the imaging device via the first communication circuit.

9. A light emission control method in an imaging device which is connectable via a connector to a flash control device having a memory storing information on whether or not the flash control device incorporates a flash, the light emission control method comprising:
   communicating with the flash control device connected to the connector to receive the information on whether or not the flash control device incorporates a flash;
   determining whether or not the flash control device incorporates a flash using the received information; and
   switching control of the flash control device in accordance with its determination of whether or not the flash control device incorporates a flash.

* * * * *